(No Model.)

E. F. GENNERT.
INSULATING JOINT OR PIPE COUPLING.

No. 373,452. Patented Nov. 22, 1887.

WITNESSES:

INVENTOR
Emil F. Gennert;
BY
ATTORNEY

UNITED STATES PATENT OFFICE.

EMIL F. GENNERT, OF BROOKLYN, NEW YORK.

INSULATING-JOINT OR PIPE-COUPLING.

SPECIFICATION forming part of Letters Patent No. 373,452, dated November 22, 1887.

Application filed July 14, 1887. Serial No. 244,299. (No model.)

*To all whom it may concern:*

Be it known that I, EMIL F. GENNERT, a citizen of the United States, residing in Brooklyn, in the county of Kings and State of New York, have invented certain new and useful Improvements in Insulating-Joints for Combined Electric Light and Gas Fixtures; and I do hereby declare that the following is a full, clear, and exact description of my invention, such as will enable others skilled in the art to which it appertains to make and use the same.

Hitherto in devices of this class it has been common to employ a multiplicity of parts, thus rendering the apparatus expensive and liable to get out of order. It has also been common to so construct such devices that on the application of the usual ceiling-plate or box-plate, which serves for a finish to hide the coupling, a short circuit would be formed, thus defeating the object to be gained by insulating the parts. Moreover, the insulating material itself has been submitted to strain or to the liability of rupture or displacement. The couplings have also been so constructed as to require an extra coupling for connecting the fixture.

It is the object of the present invention to obviate these defects by constructing a simple inexpensive connection for combined electric light and gas fixtures, or for electric-light fixtures only, such connection having few parts, relieving the insulation from strain, and making it difficult to short-circuit the different parts of the coupling, while at the same time providing means for connecting the fixture directly to the usual gas-pipe—that is to say, without any other intermediate coupling. The means by which I accomplish this result are illustrated in the accompanying drawings, in which—

Figure 1:
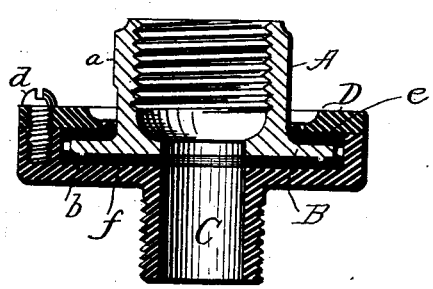
Figure 2:
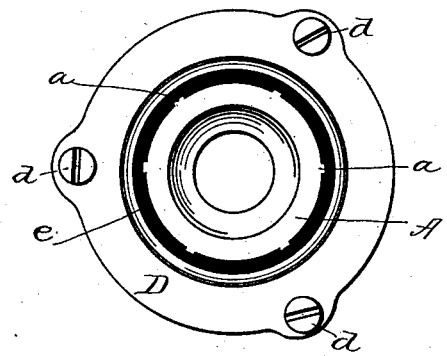
Figure 3:
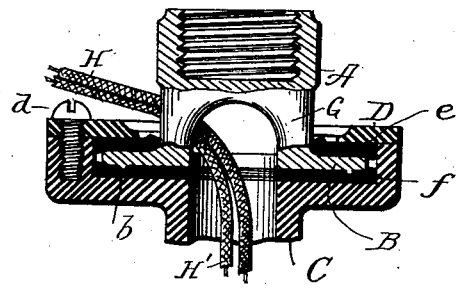

Figure 1 is a vertical section of my coupling ready to be applied to the combined electric light and gas fixture. Fig. 2 is a plan of the same, and Fig. 3 is a vertical section of a coupling designed for electric-light fixtures only.

The pipes to which couplings of this sort of electric-light fixtures, or combined electric light and gas fixtures, are connected are in practice invariably provided with male screws, while the fixtures themselves are provided with corresponding female screws. For this reason I provide that part A of my coupling, which is to be connected to the pipe with a female thread, and the part C, which is to be joined to the fixture, with a male thread. The part C is cup-shaped, as shown, or, rather, is provided with a rim, in the manner shown. The two parts are coupled together by screws *d d d*, passing through a ring, D, which fits around the rim of the coupling-half C, and projects inward over a flange, B, on the coupling-half A.

Between the bottom of the flange B and the part C is a ring, *f*, of leather or other good insulating material, which, like the part C itself, has a central opening for the passage of gas through to the fixture. Between the upper part of the same flange and the ring D is a ring, *e*, of hard rubber or other suitable insulating material. Between the outer edge of the flange B and the rim of the coupling C, I show an air-space, although this space may, if preferred, be also filled with suitable insulating material. In either case it is evident that the two halves are insulated from each other by the described construction. It is further apparent that inasmuch as the ring D is screwed over the rim of the part C by the screws *d d d* there will never be any danger of the rupture of the insulation *e* through too great pressure, as is the case in some constructions where the screw is allowed to exert its full force upon the insulation. Moreover, it will be seen that I provide the under side of the flange B with a little rib, *b*, so as to prevent the displacement of the insulation *f*, which is guarded against rupture by the same means as those which prevent the rupture of the insulation *e*.

As the part C has a male thread, it is evident that it is ready to be fitted to the fixture without any intermediate coupling. For the same reason, there can be no mistaking to which end of the coupling the fixture is to be attached, as is the case with certain similar devices on the market which have female threads at both ends. Besides, when the ceiling or box plate is applied, as indicated in dotted lines in Fig. 1, there is little or no danger of contact being made from C to A, as in order to effect such contact it would be necessary to construct the ceiling-plates very much smaller at the inner than at the outer end, which in practice is not done.

I provide ribs *a a* on the part A, so as to give a good grip or bite for the wrench or nippers.

In Fig. 3 the construction is substantially the same, except that the part A is provided with standards G, and that the central opening through the said part is closed. This coupling is designed for electric-light fixtures and the drawing shows electric wires H H' running down through the coupling, as will be readily understood.

Having now described my invention, what I claim is—

1. In an insulating pipe-joint, the combination, with the coupling-halves and interposed insulating-strips, of means for securing the halves together with the insulation between, the said means consisting of screws, whose advance is limited by a metallic portion of the coupling, whereby the insulation is relieved from the danger of rupture from the act of coupling the parts.

2. In an insulating pipe-joint, the combination, with an outer coupling-half having a male thread for attachment to a fixture, and having also a cup-shaped flange, of an inner coupling-half having a female thread, for the purpose specified, and provided with a flange, and means for holding the latter flange within the former, as and for the purpose set forth.

In witness whereof I have hereunto signed my name in the presence of two subscribing witnesses.

EMIL F. GENNERT.

Witnesses:
G. H. STOCKBRIDGE,
CHARLES S. MILLER.